United States Patent [19]
Yuasa et al.

[11] Patent Number: 6,076,972
[45] Date of Patent: Jun. 20, 2000

[54] TRACK ROLLER

[75] Inventors: Kouhei Yuasa; Yoshitaka Ogawa, both of Gifu-ken, Japan

[73] Assignee: Nippon Thompson Co., Ltd., Tokyo, Japan

[21] Appl. No.: 09/135,178

[22] Filed: Aug. 18, 1998

[51] Int. Cl.[7] ................................................. F16C 43/06
[52] U.S. Cl. ........................................................... 384/508
[58] Field of Search .................................... 384/507, 508

[56] References Cited

U.S. PATENT DOCUMENTS

| | | | |
|---|---|---|---|
| 2,530,660 | 11/1950 | Hoeffleur | 384/508 |
| 3,606,503 | 9/1971 | Asberg et al. | 384/508 |
| 5,097,565 | 3/1992 | Shorey | 384/508 X |

FOREIGN PATENT DOCUMENTS

| | | |
|---|---|---|
| 62-016495 | 4/1987 | Japan . |
| 1-247818 | 10/1989 | Japan . |
| 4-089580 | 8/1992 | Japan . |

*Primary Examiner*—Thomas R. Hannon
*Attorney, Agent, or Firm*—Browdy and Neimark

[57] ABSTRACT

The present invention relates to a track roller having inner and outer races of a large radial wall thickness, in which an insert hole close to a raceway passage and a rolling element feed hole crossing the insert hole and joined to the raceway passage are formed, whereby the loading of the rolling elements into the raceway passage can be done simply and speedily. In order to load balls which constitute the rolling elements into the raceway passage formed between a raceway groove of the outer race and that of the inner race, the inner race is provided in the portion thereof which is close to the raceway passage with the axially extending insert hole and the rolling element feed hole of a small length extending from an inner surface of the insert hole to the raceway groove of the inner race. The balls are loaded from the insert hole into the raceway grooves via the rolling element feed hole, and a plug is then fitted in the rolling element feed hole. A pin is then inserted through a first pin hole of the inner race and a second pin hole of the plug, whereby the plug is fixed to the inner race.

7 Claims, 3 Drawing Sheets

TRACK ROLLER

BACKGROUND OF THE INVENTION

1. Field of the Invention

This invention relates to a track roller having a roller, which rolls on a track of a cam mechanism or a linearly moving part, as an outer race in, for example, a loom and a transfer apparatus.

2. Description of the Prior Art

In a conventional loom and a conventional transfer apparatus, a roller having an outer race of a large thickness and rolling on a track of a cam mechanism or a linearly moving mechanism is known as a track roller. The track roller is generally in the shape of a disc, and provided with a thick-walled outer race, a thick-walled inner race and balls as rolling elements interposed between the inner and outer races. The inner race is fitted firmly around a mount member, and the outer race is supported rotatably on the inner race via the rolling elements.

The bearings for supporting the outer race of the track roller rotatably with respect to the inner race, i.e. the track roller bearings include a needle roller bearing, a cylindrical roller bearing and a ball bearing. In order to retain the rolling elements of the bearing rollably, a retainer is provided in some cases. In such a track roller, it is preferable that the bearing be provided with the largest possible number of rolling elements so as to transmit an impact imparted to the track roller between the inner and outer races. In order to load a bearing body with a plurality of rolling elements, a method of inserting the rolling elements thereinto via an insert hole formed in an outer circumferential wall of the outer race so that the insert hole extends, for example, in the radial direction thereof is conceivable.

Providing a rolling element insert hole in a bearing having opposed raceway grooves in the inner and outer races is disclosed in, for example, Japanese Utility Model Publication No. 16495/1987, Japanese Patent Laid-Open No. 247818/1989 and Japanese Utility Model Laid-Open No. 89580/1992.

The bearing disclosed in Japanese Utility Model Publication No. 16495/1987 is a cross roller bearing or a cross taper bearing in which rollers or conical rollers, which constitute rolling elements, are alternately provided. This bearing is provided with a roller insert hole in at least one portion of the outer or inner race, the inner diameter of the insert hole being set slightly larger than the diameter of rollers or the maximum diameter of conical rollers. The rollers or conical rollers inserted from this insert hole are fed into the 90° V-shaped raceway groove of the inner race, inclined gradually from the axis of the insert hole in the lateral direction by a tool, and finally turned 45° to left and right alternately with respect to the insert hole, whereby the rollers are set along the mentioned V-shaped groove. A cover which has the same shape as the insert hole and a V-shaped groove formed in an inner end surface thereof and continuous with the V-shaped groove of the inner or outer race, and which is used as a guide for the rolling elements is inserted into the insert hole. The inserted cover is fixed to the inner or outer race by a knock pin inserted thereinto from a side surface thereof.

The bearing disclosed in Japanese Patent Laid-Open No. 247818/1989 is provided in its race, which constitutes an inner or outer race, with a cylindrical roller insert hole of the smallest possible inner diameter which is between the diameter of the cylindrical rollers and the length of a diagonal of the raceway, in such a manner that, when the inserted cylindrical rollers contact the raceway surface on the inner side of the bearing they roll freely and are set properly on the raceway surface. The invention disclosed in this publication also relates to a thin-walled cross roller bearing provided with a recessed stepped portion between the inner surface of an insert hole-sealing cover and a raceway surface of a race. The thin-walled cross roller bearing is designed so as to prevent the formation of the insert hole from causing the strength of the race from lowering, prevent the occurrence of damage to the cover by avoiding the contacting of the cover and cylindrical rollers with each other, and prevent the rolling resistance of the rolling elements from increasing.

The bearing disclosed in Japanese Utility Model Laid-Open No. 89580/1992 relates to a roller lever for a cam machine which controls a held frame of a loom. In this roller lever, an outer race is supported on an inner race, which is fixed to a lever body, via rolling elements, which are inserted from a side portion of the inner race into a bearing body via a notch formed in the inner race, the notch being finally closed with a plug comprising an elastic body.

In this cross roller bearing, the radial thickness of the races including inner and outer races is not greatly large as compared with the size of the rolling elements to be loaded into a bearing body, and the outer circumferential surface of the outer race is not used as a rolling surface at which the bearing rolls on a track. Even when the outer race is provided as a rotary part, another rotary body is fitted there around, so that it is possible to form an insert hole so as to extend in the radial direction of the race, and load the rolling elements into the race through the insert hole.

In a track roller, however, both of the races, i.e. outer and inner races are formed to a large radial wall thickness and a small axial wall thickness, and the rolling element inserting structure applied to the above-described cross roller bearing cannot be applied as it is to the track roller. In order to provide an insert hole, which is similar to that in the cross roller bearing, in the track roller, a long insert hole extending from the outer circumferential surface of the outer race in the radial direction thereof is necessarily formed in the axially thin-walled outer race. Consequently, the thickness of the portion of the outer race which is left between the inner surface of the insert hole and the side surface of the outer race becomes small, and the strength necessary for the race cannot be secured. Since the insert hole becomes long, a rolling element loading operation including an operation for aligning the insert hole with a pocket of a retainer becomes difficult and takes a long time. The outer race of the track roller rolls on a track surface, such as a cam surface, and, therefore, the outer surface of the outer race has to be machined smooth surface. However, the insert hole is liable to cause a stepped portion to occur on the outer surface of the outer race.

In the roller lever for a cam machine, the plug with which to close the notch formed in the inner race is formed out of an elastically deformable material, for example, a resin material, so that it is difficult that the notch-carrying portion of the track which is elastically deformed supports a load. It is troublesome to grind or cut a notch of a certain shape, and, in such a case, the processing accuracy decreases. Since the plug closes the notch which can be seen from the outside, there is the possibility that the plug comes off when it contacts extraneous matter.

SUMMARY OF THE INVENTION

An object of the present invention is to solve these problems, and provide a track roller capable of forming an insert hole in an inner race without increasing the length thereof and without causing the strength of the inner race to decrease even when the track roller has an inner or outer race of a large radial thickness, and capable of carrying out the installation of rolling element easily and efficiently.

The present invention relates to a track roller comprising an outer race provided with a first raceway groove in an inner circumferential surface thereof, an inner race fitted in an inner circumferential surface of the outer race, adapted to be rotated relatively to the outer race and provided in an outer circumferential surface thereof with a second raceway groove opposed to the first raceway groove, and rolling elements rolling in a raceway passage formed between the first and second raceway grooves, the inner race being provided with an insert hole close to the second raceway groove, and a rolling element feed hole extending from the inner surface of the insert hole into the second raceway groove, the rolling element feed hole being sealed with a plug.

In this track roller, the outer race is supported rotatably on the inner race as mentioned above via the rolling elements interposed between the first raceway groove formed in the inner circumferential surface of the outer race and the second raceway groove formed in the outer circumferential surface of the inner race. In order to assemble the track rail, the rolling elements are inserted into the insert hole formed close to the second raceway groove of the inner race, and then loaded into the raceway passage via the rolling element feed hole formed so as to extend from the inner surface of the insert hole into the second raceway groove. When the loading of all rolling elements into the raceway passage has been completed, the plug is fitted in the rolling element feed hole to close the same. Therefore, the rolling element feed hole does not need to be formed in the outer face of a large wall thickness and a small axial width, and the rolling elements can be loaded into the raceway passage easily and in a short working time via the insert hole formed close to the second raceway groove of the inner race and the short-distance through rolling element feed hole extending between the inner surface of the insert hole and second raceway groove.

The inner race is fixed to a mount member by a screw engaged with a threaded hole made in the inner race. The mount member may be a stationary member or a member moving with an apparatus.

The thread of this threaded hole is formed in the insert hole. Namely, the insert hole from which the rolling elements and plug are inserted is utilized as a threaded hole with which the screw for fixing the inner race to the mount member is engaged. Using the insert hole also as a threaded hole enables the number of holes formed in the inner race to be reduced, so that it becomes possible to improve the strength of the inner race, and reduce the manday of the boring work and the track roller manufacturing cost.

The inner race is provided with a central hole, which is utilized to reliably position the track roller when the central hole is fitted around a shaft of a mount member.

The inner race is provided with a first pin hole which crosses the rolling element feed hole, while the plug is provided with a second pin hole which is aligned with the first pin hole, the plug being fixed in the rolling element feed hole by a pin inserted through the first and second pin holes. When the loading of the rolling elements into the raceway passage has finished, the plug is fitted in the rolling element feed hole so as to prevent the rolling elements from coming off. In order to fix the plug reliably in the rolling element feed hole, a pin is inserted from the outside into the first pin hole formed in the inner race so as to cross the rolling element feed hole and the second pin hole formed in the plug. When the diameter of the pin is set slightly larger than that of the first and second pin holes, the pin is fitted a little tightly in the first and second pin holes. Accordingly, the fixing of the plug in the rolling element feed hole is done easily and reliably.

The surface of the plug which faces the raceway passage constitutes a part of the second raceway groove of the inner race. The plug is formed out of the same metal material as the inner race, and one end of the plug, i.e. the surface thereof which faces the raceway passage formed by the first and second raceway grooves and used for the rolling of the rolling elements is provided with a groove in which the rolling elements can roll, this groove constituting a part of the second raceway groove. Therefore, the rolling elements roll smoothly without rattling in the portion of the raceway passage in which the rolling element feed hole is provided.

An annular opening formed between the inner and outer races is covered with a rolling element holding retainer. Between the inner and outer races, an annular opening is provided in which a part of the raceway passage is exposed to the outside in a side portion of the track roller. In order to have the rolling elements roll smoothly, a lubricating oil is required in general, and the lubricating oil scatters from this annular opening. In some cases, in which a track roller is used in a certain working environment, dust and extraneous matter enters the raceway passage from the outside. In order to prevent these inconveniences, it is convenient to close the annular opening by utilizing the rolling element retainer as a cover.

The retainer holds the rolling elements in a circumferentially spaced state. When the rolling elements are fed from the feed hole into the raceway passage, the operation for meeting the purpose should not be hampered by the retainer. Therefore, the retainer needs to be opened radially, especially, radially inward. When adjacent rolling elements are jammed on each other, a smooth rolling of the track roller is prevented. Accordingly, it is preferable that the rolling elements be retained individually in the circumferential direction by the retainer. The retainer in use comprises, for example, a retainer having a pocket-carrying structure.

In addition, the rolling element feed hole, insert hole and first pin hole are formed in a cross-sectionally circular shape by boring work. The boring work is generally carried out by a drill in a simple manner. Forming a heteromorphic notch for use in feeding rolling elements thereinto is difficult in some cases from the point of view of machining therefor, and constitutes a cost increasing factor sometimes. In order to form the insert hole, the inner race may be drilled in the direction of the axis of rotation of the track roller, and, in order to form the rolling element feed hole, the drilling of the inner race may be done from the radially outer side thereof toward the insert hole. The hole-making work can be carried out very simply, and the manufacturing cost becomes low. The first pin hole is also formed in the same manner as the insert hole except that the diameter is set differently. When these holes are circular, the plug and pin to be inserted thereinto can also be formed to a cross-sectionally circular shape, i.e., the engagement of the members of the circular shape can attain the object. This enables the machining precision and assembling accuracy to be improved.

This track roller is formed as described above. Since the radial wall thickness of the inner race is large, the forming of the rolling element feed hole in the inner race from the circumferential surface thereof is difficult but the rolling element feed distance is short, so that the inserting of the rolling elements and the feeding of the same into the raceway passage can be done simply and speedily. Also, the inserting of the plug for closing the feed hole can be done simply and speedily. The insert hole and rolling element feed hole are not heteromorphic recesses but they are made by boring work. Accordingly, the hole-making operation can be carried out simply and inexpensively, and the overall track roller manufacturing cost including the rolling element loading cost can be reduced. Moreover, since the plug can be made of the same metal material as the inner race, the front and surface of the plug can be formed as a part of the raceway groove of the inner race, and the rolling of the rolling elements in the raceway passage can also be done smoothly.

DETAILED DESCRIPTION OF THE EMBODIMENT:

An embodiment of the track roller according to the present invention will now be described with reference to the drawings. First, the outline of a track roller 1 will be described with reference to FIGS. 1 and 2.

Figure 1:
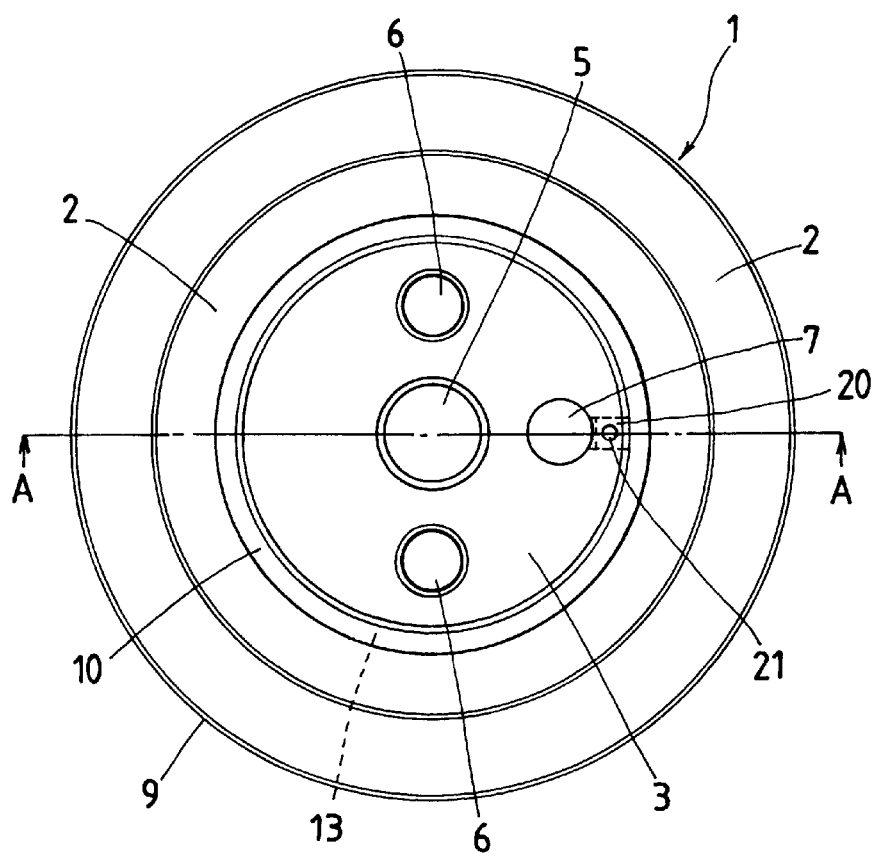
FIG. 1 is a plan view showing an embodiment of the track roller according to the present invention.

The track roller 1 shown in FIG. 1 basically comprises an outer race 2, an inner race 3, and balls 4 as rolling elements interposed between the outer and inner races 2, 3 and enabling the outer and inner races 2, 3 to be relatively rotated, and is generally formed to the shape of a flat circular plate. The inner race 3 has a central hole 5, and a plurality of screw holes 6 formed in the positions offset from the central hole 5. The inner race 3 is utilized for the positioning of the track roller by inserting a shaft of a mount member (not shown) into the central hole 5. Bolts are screwed into the screw holes 6, whereby the mount member is held forcibly between the head portions of the bolts and the inner race 3, the track roller 1 being thus fixed to the mount member. The mount member is provided in an apparatus, which utilize the rolling of a track roller 1 on a track, such as a loom and a transfer apparatus. The inner race 3 is provided with an insert hole 7 into which the balls 4 and a plug 20 are to be inserted and a rolling element feed hole 8 (refer to FIG. 3) communicating with the insert hole 7 and extending in the radial direction, and these holes will be further described later.

The outer race 2 is used as a roller rolling on a track having a cam surface (not shown) or a linear flat surface (not shown), and has a rolling surface 9, which roll-contacts a track, on the outer circumferential side thereof. The track roller 1 is generally formed compactly with the thickness in the direction of rotation thereof set small as compared with the radial size thereof, and the same applies to the outer race 2. The outer race 2 is rotated with respect to the inner race 3, which is fixed to the mount member, via a plurality of balls 4.

Figure 2:
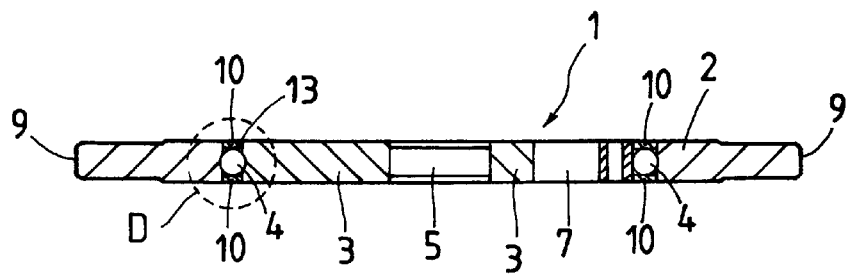
FIG. 2 s a sectional view taken in the direction of the arrows of and along the arrow-carrying line A—A of the track roller of FIG. 1.
Figure 5:
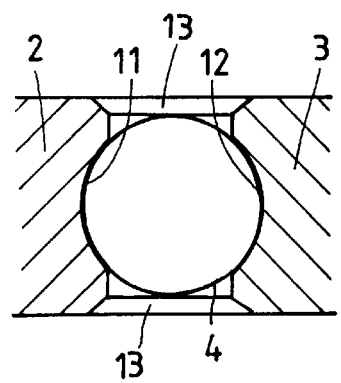
FIG. 5 is an enlarged sectional view of a raceway passage of the track roller, i.e. a region D of what is shown in FIG. 2.

The relation between the balls 4 and the outer and inner races 2, 3 is shown in FIG. 5 in which a region D of FIG. 2 is shown in an enlarged scale. FIG. 5 is a cross-sectional view of raceway grooves 11, 12 with a retainer 10 removed. As shown in FIG. 5, the outer race 2 is provided with the raceway groove 11, and the inner race 3 the raceway groove 12. The raceway grooves 11, 12 are formed cross-sectionally arcuately, and a raceway passage 13 in which a plurality of balls 4 roll is formed between the two raceway grooves 11, 12.

Figure 6:
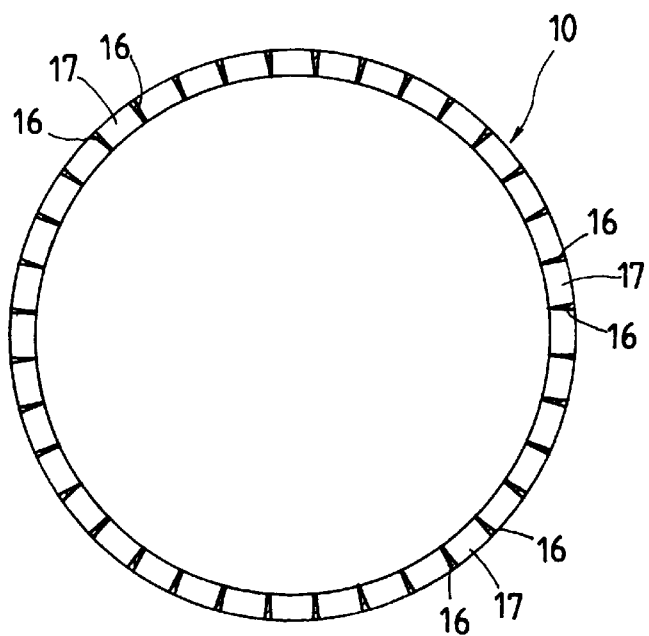
FIG. 6 illustrates a rolling element retainer used for the track roller of FIG. 1, i.e., it is a sectional view taken in the direction of the arrows of and along the arrow-carrying line C—C in FIG. 7.
Figure 7:
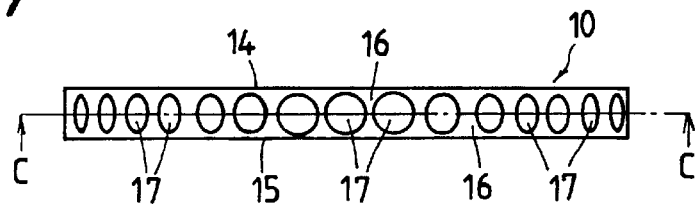
FIG. 7 is a side view of the retainer of FIG. 6.

The balls 4 are held in the raceway passage 13 by the retainer 10. The retainer 10 has a construction shown in FIGS. 6 and 7. Namely, the retainer 10 is provided with both side portions 14, 15, and partition portions 16 extending between the two side portions 14, 15. The balls 4 necessarily roll in pockets 17, which are enclosed with the two side portions 14, 15 and partition portions 16, in the retainer 10. Since the pockets 17 are opened in the radial direction, the balls 4 being loaded into the raceway passage 13 can be received thereby through the rolling element feed hole 8 which will be described later. Although the balls 4 can pass through the retainer 10 in the radial direction thereof, they are held by the two side portions 14, 15 so that they cannot slip out in the axial direction of the track roller 1. The balls 4 are held separately by the partition portions 16 so that the balls do not interfere with adjacent balls 4.

Figure 3:
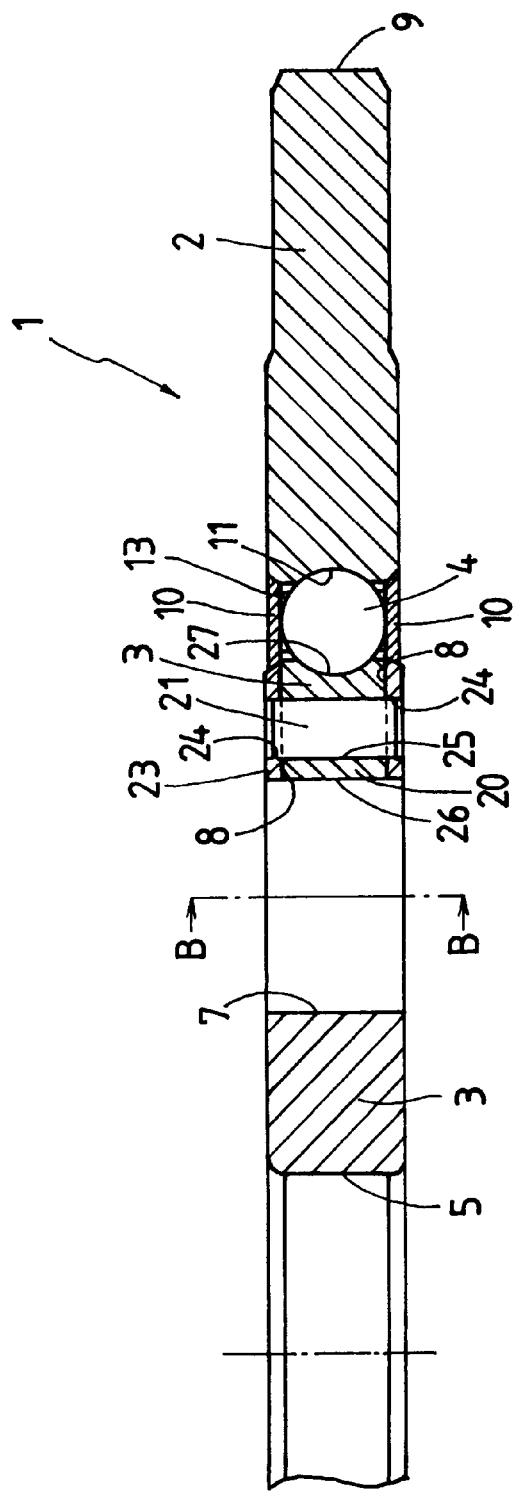
FIG. 3 an enlarged sectional view of a part of the track roller of FIG. 2.
Figure 4:
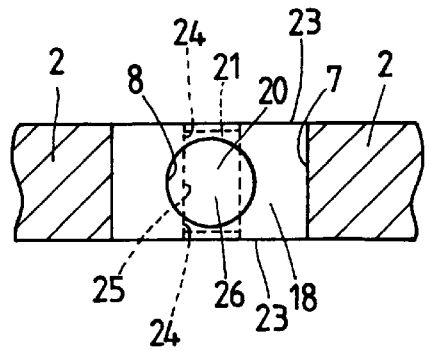
FIG. 4 is a sectional view taken in the direction of the arrows of and along the arrow-carrying line B—B of the track roller of FIG. 3.

A structure enabling the balls 4 to be loaded into the raceway passage 13 will now be described on the basis of what are shown in FIGS. 3 and 4. FIG. 3 is an enlarged sectional view of the region of the sectional view of FIG. 2 which includes the insert hole 7 and rolling element feed hole 8 in the central portion thereof. As shown in FIG. 1, the inner race 3 is provided with the insert hole 7 in the vicinity of the outer circumference (i.e. raceway groove 12) thereof. In the illustrated embodiment, the insert hole 7 is provided so as to be offset radially by the same distance as the screw holes 6 with respect to the center of the inner race 3. As is understood from FIGS. 3 and 4, the rolling element feed hole 8 is provided which extends radially through the inner race 3 from the inner surface 18 of the insert hole 7 to the raceway groove 12. The center of the rolling element feed hole 8 agrees with that of the width of the inner race 3 in the direction of rotation thereof, and the rolling element feed hole 8 is opened with the center thereof aligned with the deepest portion of the raceway groove 12. The size of the rolling element feed hole 8 is set slightly larger than that of the balls 4. The size of the insert hole 7 is larger than that of the rolling element feed hole 8, and large enough to permit the balls 4 and a plug 20 which will be described later to be inserted thereinto. Accordingly, the balls 4 are loaded successively from the insert hole 7 into the raceway passage 13 through the rolling element feed hole 8. The feeding of the balls 4 is done as the outer race 2 is turned every time one ball 4 is fed. When the retainer 10 is used, the retainer 10 is turned every time one pocket 17 thereof receives one ball 4, and, consequently, a subsequent empty pocket 17 arrives at the position of the rolling element feed hole 8.

When all the necessary balls 4 have finished being loaded into the raceway passage 13, the rolling element feed hole 8 is closed with the plug 20 so that the balls 4 do not roll back to the rolling element feed hole 8. The plug 20 is substantially shaped so as to seal the rolling element feed hole 8. The plug 20 is inserted from the insert hole 7 into the rolling element feed hole 8 and fixed as it is by a pin 21 inserted from a side portion 23 of the inner race 23. In order to insert the pin 21 into the inner race 3, first pin holes 24 are formed in alignment with each other in both side portions 23 of the inner race 3. The plug 20 is also provided with a second pin hole 25 which communicates, when the plug is fitted in a predetermined portion of the rolling element feed port 8, with the first pin holes 24, and which has the same size as the first pin holes 24. Since the pin 21 is tight-fitted to a certain extent in the first and second pin holes 24, 25, the plug 20 can be fixed to the inner race 3 by inserting the pin 21 into the pin holes 24, 25.

An end surface 26 on the side of the insert hole 7 of the plug 20 is formed so that the end surface 26 does not project beyond the inner surface 18 of the insert hole 7 but this does not constitute a strict limitation. An end surface 27 on the side of the raceway passage 13 of the plug 20 constitutes a part of the raceway groove 12 of the inner race 3. In order to form such a raceway groove 12, a raceway groove continuous with the raceway groove 12 is formed in advance by a grinding process with the plug fitted in the rolling element feed hole 8, and the plug 20 is then removed from the rolling element feed hole 8 to make preparations for the loading of the balls. Since the plug 20 is formed out of the same kind of metal material as the inner race 3, a certain level of load of the balls 4 can be received at the raceway groove formed in the end surface 27. Since the insert hole 7, rolling element hole 8 and first and second pin holes 24, 25 are usually formed circularly, the boring operations can be carried out easily. The plug 20 and pin 21 are also formed round in accordance with these circular holes, so that the former can be fitted firmly in the latter with a high accuracy. The processing accuracy is not influenced by the plug.

An embodiment of the track roller according to the present invention has been described above. However, the present invention is not limited to this embodiment. It can be modified variously. For example, one of the screw holes 6 can be formed as an insert hole 7. Since the plug 20 is fitted in a buried state in the rolling element feed hole 8 after the loading of the balls 4 has been finished, the plug 20 does not interfere with the screw driven into the screw hole 6. Accordingly, one of the plurally provided screw holes 6 can be utilized as the insert hole 7 without forming the insert hole 7 for only inserting the balls 4 and plug 20 thereinto. Regarding the retainer, various types of structures can also be employed as long as they do not hamper the loading of the balls 4 and without being limited to the example shown in FIGS. 6 and 7. The means for fixing the plug 20 may comprise a means other than the pin 21, i.e., a suitable means, such as a screw and a fusable structure.

What is claimed is:

1. A track roller comprising an outer race provided with a first raceway groove in an inner circumferential surface thereof, an inner race fitted in an inner circumferential surface of said outer race, adapted to be rotated relatively to said outer race and provided in an outer circumferential surface thereof with a second raceway groove opposed to said first raceway groove, and rolling elements rolling in a raceway passage formed between said first and second raceway grooves, said inner race being provided with an insert hole close to said second raceway groove, and a rolling element feed hole extending from an inner surface of said insert hole into said second raceway groove, said rolling element feed hole being sealed with a plug;

wherein said inner race is fixed to a mount member by screws engaged with screw holes formed in said inner race; and wherein said screw hole is formed as said insert hole.

2. A track roller comprising an outer race provided with a first raceway groove in an inner circumferential surface thereof, an inner race fitted in an inner circumferential surface of said outer race, adapted to be rotated relatively to said outer race and provided in an outer circumferential surface thereof with a second raceway groove opposed to said first raceway groove, and rolling elements rolling in a raceway passage formed between said first and second raceway grooves, said inner race being provided with a central hole for inserting a shaft of a mount member, an insert hole separate from the central hole and close to said second raceway groove, and a rolling element feed hole extending from an inner surface of said insert hole into said second raceway groove, said rolling element feed hole being sealed with a plug;

wherein said inner race is provided with a first pin hole crossing said rolling element feed hole, said plug being provided with a second pin hole aligned with said first pin hole, said plug being fixed to an inner portion of said insert hole by a pin inserted into said first and second pin holes.

3. A track roller according to claim 2, wherein said inner race is fixed to said mount member by screws engaged with screw holes formed in said inner race.

4. A track roller according to claim 2, wherein the surface facing said raceway passage of said plug constitutes a part of said second raceway groove of said inner race.

5. A track roller according to claim 2, wherein an annular opening formed between said inner and outer races is covered with a retainer which holds said rolling elements.

6. A track roller according to claim 2, wherein said insert hole, said rolling element feed hole, and said first pin hole are formed to a cross-sectionally circular shape by a boring process.

7. A track roller according to claim 1, wherein said insert hole and said first and second pin holes are generally parallel to the central hole.

\* \* \* \* \*